sub-

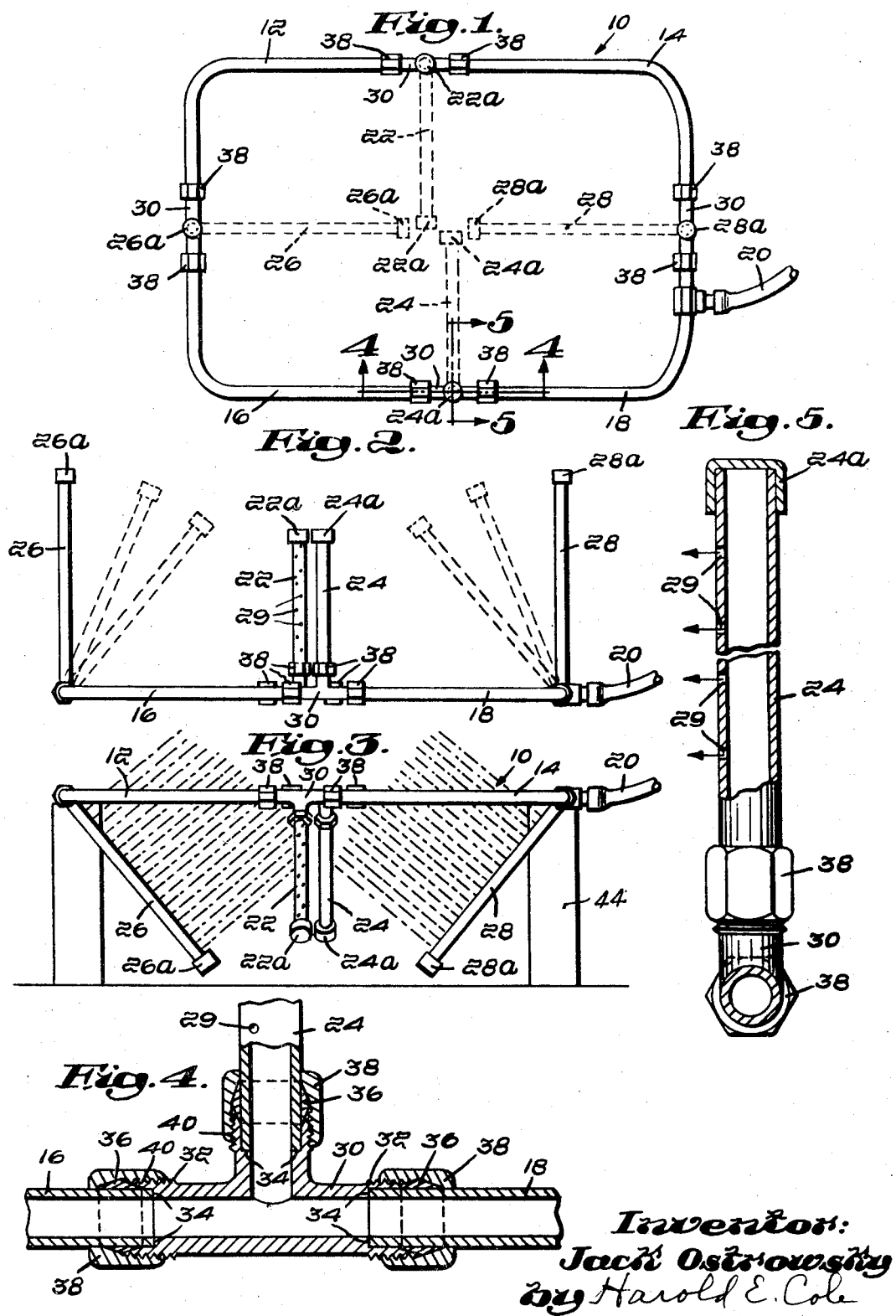

United States Patent Office 3,465,369
Patented Sept. 9, 1969

3,465,369
SHOWERBATH APPARATUS
Jack Ostrowsky, 22 Malden St., Everett, Mass. 02149
Filed Mar. 8, 1967, Ser. No. 621,506
Int. Cl. A47k 3/22, 3/24
U.S. Cl. 4—150                                    5 Claims

ABSTRACT OF THE DISCLOSURE

Showerbath apparatus, suitable for use in a bathtub or outdoors, has a conduit support with riser conduits extending therefrom having ports through which water flows to an approximately common point, the riser conduits being pivotably adjustable as to their position.

BACKGROUND OF THE INVENTION

The principal object of my invention is to provide apparatus that will direct water on a child, sitting in a bathtub, from sources positioned at several different points.

Another object is to provide said apparatus with riser conduits that are adjustable as to position, so the streams of water may reach a child at whichever places on his body are desired, and which streams may be greatly varied in direction thus adding to the delights of taking a showerbath.

A further object is to so construct my apparatus that it can be inverted and with said riser conduits providing upwardly directed streams thus serving as an outdoor showerbath.

The foregoing and other objects which will appear as the nature of the invention is better understood, may be accomplished by a construction, combination and arrangement of parts such as is disclosed by the drawing. The nature of the invention is such as to render it susceptible to various changes and modifications, and, therefore, I am not to be limited to the construction disclosed by the drawing, nor to the particular parts described in the specification; but am entitled to all such changes therefrom as fall within the scope of my claim.

In the drawing:

FIG. 1 is a top plan view of my showerbath apparatus, the riser conduits being shown by dash lines in horizontal position.

FIG. 2 is a side elevational view of my apparatus, the dash lines showing riser conduits in various diagonal positions.

FIG. 3 is a side elevational view showing my apparatus in inverted position and serving as an outdoor showerbath, the conduit support being shown resting on blocks, the dash lines indicating the direction of the fluid from the riser conduits.

FIG. 4 is an enlarged, sectional view taken on the line 4—4 of FIG. 1.

FIG. 5 is an enlarged, sectional view taken on the line 5—5 of FIG. 1.

As illustrated, my showerbath apparatus has a conduit support 10 preferably formed of four delivery or supply conduits 12, 14, 16 and 18 in communication with each other, and which, as shown, provide a substantially rectangularly-shaped conduit support. Since it usually will be used to fit inside of the usual family bathtub it may be 24 inches long and 16 inches wide, for instance, or it could be square. A feed conduit 20 communicates with said conduit support 10 at conduit 18, and is adapted to connect with a faucet, not shown, through which water or other fluid flows from a source, not shown.

Four riser or shower conduits 22, 24, 26 and 28 provide a showerbath. They respectively communicate with said delivery supply conduits, preferably being positioned at four locations spaced approximately an equal distance apart, as shown.

Said risers are connected to and communicate with said delivery conduits by connecting means illustrated in detail in said FIGS. 4 and 5. In each instance a T 30 has interior threads 32 at all three ends and an interior shoulder 34 at three ends also, against which a said delivery conduit or riser conduit bears after entering said T. A connector member 36 is referred to as a ferrule. It tightly receives a portion of a said delivery or riser conduit. It also extends into the interior of a coupling nut 38 that is interiorly threaded as at 40 to make connection with said T threads 32. This provides a water tight connection in each instance where one delivery conduit communicates with another through a said T, and also where a said riser conduit communicates with a said delivery conduit through a said T.

Movement of said riser conduits is effected, in each instance, by rotative movement of a said T which said threaded connection between the latter and said coupling nut 38 permits.

Said riser conduits are individually movable to any position between vertical and horizontal, two of them being shown in dash lines in diagonal positions in said FIGS. 2 and 3. In this case a baby, for instance, would occupy an intermediate position within the space encompassed by said conduit support 10 where he would be showered by streams of water passing through ports 29, later described.

Said riser conduits 22, 24, 26 and 28 are closed at their outer ends by caps 22a, 24a, 26a and 28a respectively.

Each said riser conduit 22, 24, 26 and 28 has ports that are identified, in all instances, by the numeral 29. These ports are located at the surface facing the space encompassed by the conduit support of each said riser conduit, being vertically spaced apart in position of use and preferably staggered as shown in said FIGS. 2 and 3. The riser conduits may be 10 inches long, for instance. Thus streams of fluid will be directed inwardly of said conduit support 10 and also inwardly of said riser conduits when the latter are in diagonal positions, such as shown in said FIGS. 2 and 3. Thus a child or other person sitting in a bathtub about the middle of said conduit support 10 could be showered by streams coming from four main directions, that flow out of said ports 29 of said four riser conduits.

My apparatus is so constructed that it may be inverted and placed on a flat surface and yet serve a useful purpose. If used outdoors it may be laid on grass, for instance, in an inverted position with said riser conduits in horizontal position, or preferably in partially raised position. Said ports 29 thus would be at the upper surface of said riser conduits and streams of fluid would flow through said ports upwardly, thus providing an outdoor showering device as illustrated in said FIG. 3. Also it could be suspended overhead; but not inverted, and thus provide a showerbath device with the fluid falling downwardly through said ports.

Said supply conduits 12, 14, 16 and 18 could be elevated by placing blocks 44 under them when in inverted position, as shown in said FIG. 3, with said riser conduits positioned to point diagonally downward so that streams through said ports would be directed upwardly and interiorly of said support 10. Thus they would be directed towards a common or central point where a child could be standing.

What I claim is:

1. A portable showerbath apparatus for use in a bathtub or outdoors comprising an endless delivery conduit support, a plurality of at least three elongate riser conduits communicating with said conduit support and separately pivotable about said conduit support in planes substantially perpendicular to the plane of said conduit support and connected thereto at points in angular relationship to each other, each said riser conduit, when in raised position ready for use, having ports so located as to direct streams of liquid into the bathing area encompassed by said endless conduit support.

2. Showerbath apparatus as set forth in claim 1, said conduit support defining a substantially rectangular figure having all portions in substantially the same horizontal plane when in position for use.

3. Showerbath apparatus as set forth in claim 1, there being two pairs of said riser conduits the two conduits of one of said pairs being directly opposite each other.

4. Showerbath apparatus as set forth in claim 1, the ends of said riser conduits terminating at points within the area encompassed by said conduit support and adjacent each other when pivoted to substantially horizontal lowered position.

5. Showerbath apparatus as set forth in claim 4, there being two pairs of said riser conduits, one pair of said riser conduits being of such length that they overlap at their outer ends those riser conduits that are at right angles thereto when in said lowered position.

References Cited

UNITED STATES PATENTS

| | | | |
|---|---|---|---|
| 963,945 | 7/1910 | Sandham | 4—150 |
| 1,203,874 | 11/1916 | Hilfiker | 4—148 |
| 1,339,593 | 5/1920 | Booth | 4—150 |
| 1,343,892 | 6/1920 | Bagnulo | 4—150 |
| 1,415,014 | 5/1922 | Booth | 4—150 |
| 1,426,046 | 8/1922 | Cohen | 4—150 |
| 2,192,565 | 3/1940 | Szekely | 285—156 |
| 2,480,858 | 9/1949 | Hobbs | 285—341 |
| 2,557,930 | 6/1951 | Bard | 285—341 |
| 2,770,812 | 11/1956 | Whiteside | 4—150 |
| 2,829,379 | 4/1958 | McGee | 4—145 |
| 3,106,722 | 10/1963 | Logan et al. | 4—145 |

LAVERNE D. GEIGER, Primary Examiner

D. MASSENBERG, Assistant Examiner

U.S. Cl. X.R.

4—152